B. E. ELDRED.
PROCESS OF AND APPARATUS FOR BURNING CEMENT AND LIKE MATERIALS.
APPLICATION FILED APR. 21, 1908.
928,512.
Patented July 20, 1909.
2 SHEETS—SHEET 1.
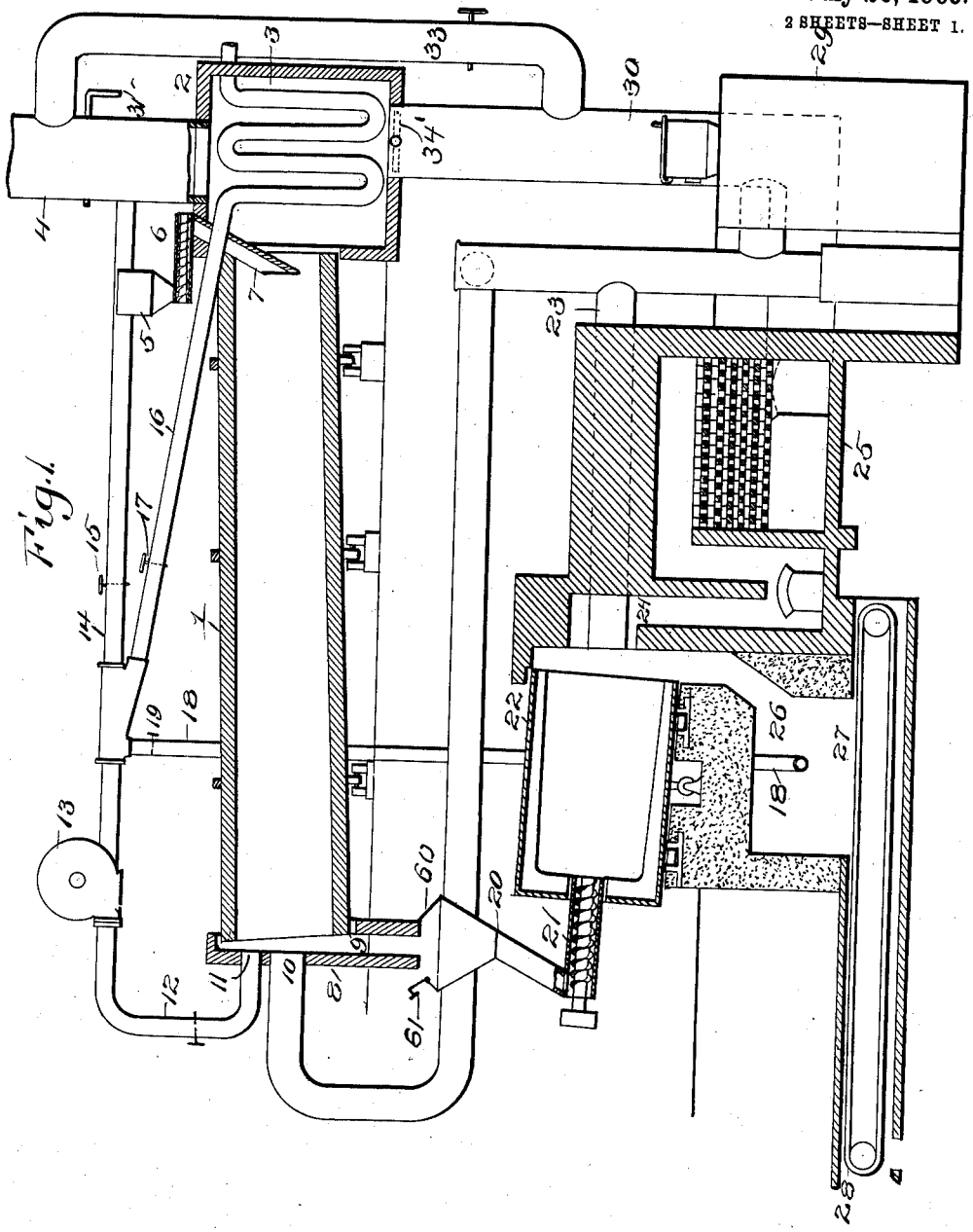

B. E. ELDRED.
PROCESS OF AND APPARATUS FOR BURNING CEMENT AND LIKE MATERIALS.
APPLICATION FILED APR. 21, 1908.
928,512.
Patented July 20, 1909.
2 SHEETS—SHEET 2.
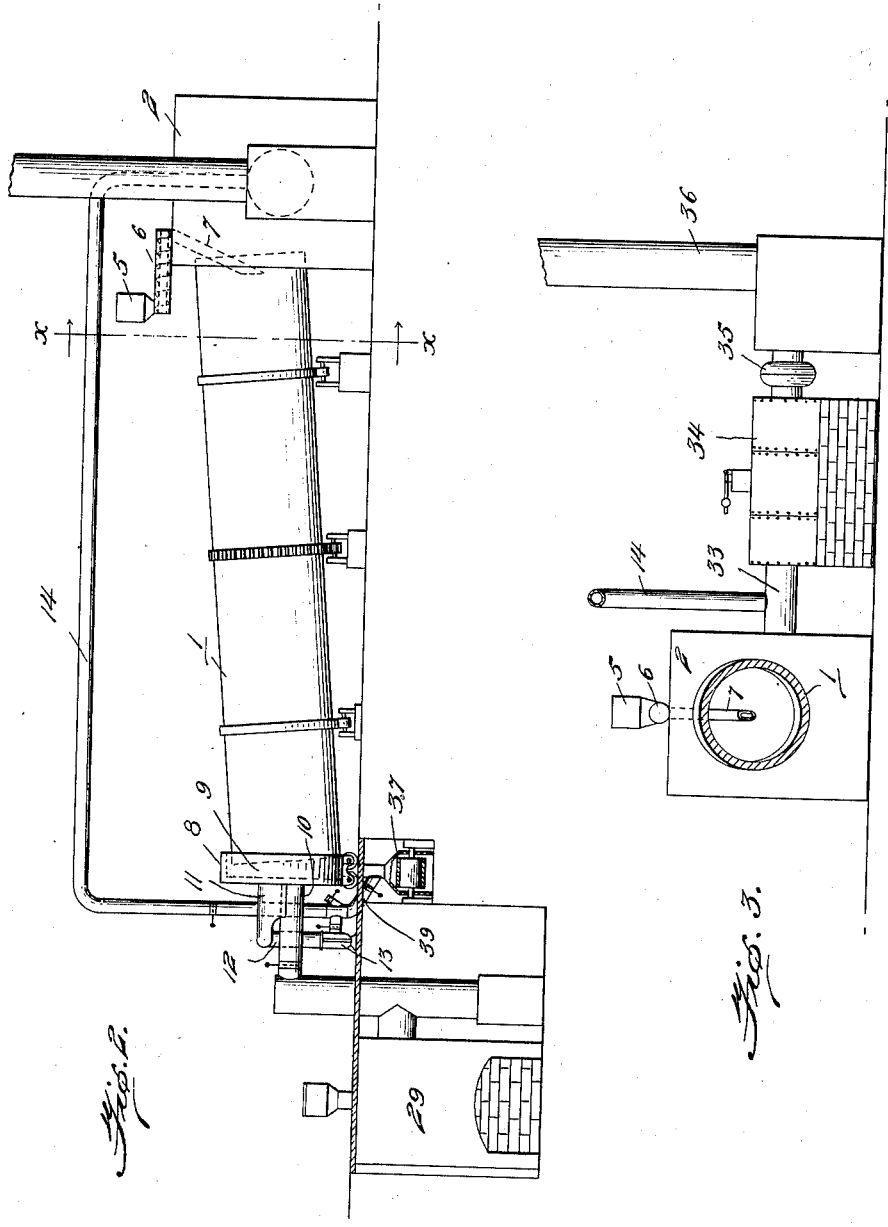

UNITED STATES PATENT OFFICE.

BYRON E. ELDRED, OF BRONXVILLE, NEW YORK, ASSIGNOR TO THE ELDRED & PALMER COMPANY, OF NEW YORK, N. Y., A CORPORATION OF NEW YORK.

PROCESS OF AND APPARATUS FOR BURNING CEMENT AND LIKE MATERIALS.

No. 928,512.     Specification of Letters Patent.     Patented July 20, 1909.

Application filed April 21, 1908. Serial No. 428,303.

*To all whom it may concern:*

Be it known that I, BYRON E. ELDRED, a citizen of the United States, residing at Bronxville, in the county of Westchester and State of New York, have invented certain new and useful Improvements in Processes of and Apparatus for Burning Cement and Like Materials; and I do hereby declare the following to be a full, clear, and exact description of the same, such as will enable others skilled in the art to which it appertains to make and use the same.

This invention relates to processes of and apparatus for burning cement and like materials; and comprises a method of calcining calcareous materials by the use of a slowly burning mixture of gas admixed with air and neutral diluent gases, of removing and clinkering the calcines so produced and of recovering heat for use in the operation; and it also comprises certain combinations of apparatus useful for the described and other purposes; all as more fully hereinafter described and as claimed.

In the ordinary methods of producing cement clinker a dry mixture of clay and limestone, naturally or artificially mixed, is fed down a rotary inclined kiln past an aerially supported flame of powdered coal. This method is quite wasteful of fuel since the production of cement clinker involves at least two wholly diverse main reactions; the calcination of the limestone to produce lime, an operation requiring a large quantity of heat but no great temperature, and the union of this lime with the clay to form clinker, an operation requiring a high temperature but no great amount of heat. A single flame cannot well produce both these reactions with a maximum economy of each. In another patent, No. 829,956, Sept. 4, 1906, I have described and claimed an improved process of burning cement in which separate sources of heat are employed to accomplish these diverse purposes and in Patent No. 829,957, Sept. 4, 1906, I have described and claimed certain combinations of apparatus for the same purposes. In the present invention I have devised certain improvements in the methods and means of said patents.

In the stated patents, the raw materials are first fed into a calcining kiln where they are treated by a source of heat giving a great volume of heat with a comparatively low temperature until such materials have been calcined, that is, have been substantially completely deprived of contained carbon dioxid, and the calcines are then treated in another kiln maintained at a high temperature to cause the lime and clay to unite to form clinker. In the calcining kiln, producer gas may be burned by hot air to give the necessary conditions. I have now discovered that better results may be obtained in the calcining kiln by burning the producer gas or other gas in a particular manner. While calcination, as stated, requires a large volume of heat at a comparatively low temperature it also depends very much on other conditions, such as the composition of the gas mass bathing the calcining material, the speed of evolution of carbon dioxid under the laws of mass action, or the "phase rule," being, roughly speaking, inversely proportional to the amount of carbon dioxid already present in the gas mass into which the carbon dioxid is being evolved. To economize heat, it is very desirable to burn the gas in the calciner with hot air, heated by recovered heat, but producer gas and other combustible gases when burned with hot air give comparatively short hot flames and the flame gases tend to rise into the arch of the kiln away from the material under treatment while such material becomes bathed with a current of the gases produced by its own decomposition; *i. e.*, containing large percentages of carbon dioxid, this current flowing up the kiln under the current of hot flame gases. In the present invention, this disadvantage is obviated by burning the gas with hot diluted air, the extent and nature of the dilution being such as to produce a slowly burning mixture of gas and air substantially filling the kiln and evolving heat throughout its extent without tending to stratify. With a flame of this character the heat is applied substantially uniformly to the material under treatment, being developed in place, so to speak, instead of being generated elsewhere, as with a short hot flame, and the evolved carbon dioxid is at once mixed with and diluted by the flame gases without exercising a "back pressure" on further evolution as in cases where it persists as a distinct stratum above the material. When the carbon dioxid is so swept away, the temperature required for quick dissociation of calcium carbonate is much lowered and the heat is much better utilized.

While other gas than producer gas may be utilized in the present invention with the same improved results: the production of a voluminous, slowly burning, comparatively cool flame—yet producer gas I consider particularly applicable and it will be set forth as the preferred material hereinafter.

Ordinary flames burning in air possess a sort of cored structure, there being a central core of gas surrounded by a stratum of mixed gas and air in a state of active combustion, this being in turn surrounded by jackets of air and of products of combustion. If however the air be replaced by air diluted with products of combustion, kiln gases and the like, the cored and stratified structure tends to disappear, the flame lengthening out, becoming cooler and becoming much more voluminous. This is partly due to the sheer diluent action of the nitrogen and carbon dioxid of the products of combustion and partly due to the specific retarding action exercised upon combustion by carbon dioxid. With sufficient dilution, the flame structure may wholly or substantially disappear and a gas mass be obtained which is burning throughout, localization of development of heat almost disappearing also. With very high dilutions, the admixed gases may become incapable of burning except in a hot-walled region affording radiant heat.

In the accompanying illustration I have shown, more or less diagrammatically, certain apparatus adapted for use in the described process and for employment for other purposes.

In this showing, Figure 1 is a view, mainly in central vertical section, of a calcining kiln adapted for use with a diluted flame and of a clinkering kiln receiving calcines therefrom; Fig. 2 is a view, mainly in elevation, of a calcining kiln; and Fig. 3 is a view of the calcining kiln and accessory structures taken at a right angle to the view of Fig. 2 along the line $x-x$ of Fig. 2, the kiln being shown in section and the accessory parts in elevation.

In Fig. 1, element 1 is an inclined rotary kiln, driving gears, speed changing mechanism and similar elements being omitted for the sake of simplicity of illustration. The upper end enters a chamber 2, provided, as shown, with air heating coils 3 and with stack 4 for discharge of waste gases. Hopper 5, conveyer 6 and chute 7 discharge raw material into the upper end of the kiln. The lower end of the calciner is provided with a stationary housing 8 having a conduit 9 for discharge of calcines. The housing is provided with a gas port or burner 10, air port 11 and the customary sight and other holes (not shown). Communicating with the air port is a valved pipe 12 from the blast side of fan 13. Entering the suction side of the fan is a pipe 14, valved at 15, and communicating with the stack whence it draws waste kiln gases. A branch pipe 16, valved at 17, establishes communication with the air heater or recuperator at the upper end of the calciner while another pipe 18, valved at 19, allows withdrawal of hot air from the clinker discharge of the clinkering kiln.

Below the calcining kiln just described is shown a clinkering kiln, substantially like that shown and claimed in my Patent No. 879,448, Feb. 18, 1908, and accessory apparatus.

Calcines from the calciner pass into hopper 20 having a closure 60 provided with door 61, at the point where it communicates with clinker discharge 9, and are delivered by conveyer 21 into the upper end of a short rotary inclined kiln 22, wherein they are clinkered by the heat of a flame produced by a jet of producer gas coming through conduit 23 and by air entering through conduit 24 from the diagrammatically shown regenerator 25. Clinker is discharged from the lower end of the clinkering kiln into clinker pit 26, whence it passes out by conveyer 27, heating air passing over it through conduit 28 between the top of the conveyer and the casing in which it travels. The hot air is drawn from the clinker pit to feed the calciner through the described pipe (18). Waste products of combustion from the kiln pass alternately through regenerator 25 and another regenerator (not shown) and gain access to stack 30.

Producer 29 furnishes gas to both the clinkering kiln and the calcining kiln. Flue 30 withdraws waste gases from the regenerator of the clinker kiln and discharges them into the housing at the upper end of the calcining kiln to assist in heating the recuperator there shown. In the stack above the recuperator chamber is a damper 31 to assist in regulating the velocity of gas travel in the calcining chamber.

The producer should be run to produce as rich a gas as practicable, this gas being either ordinary producer gas or water gas. A rich gas may be obtained by using a portion of the calciner waste gases in the draft current of the producer. The gas should not contain more than 4 or 5 per cent. of $CO_2$. In burning this gas in the calciner, the dilution of the air should be made such as to produce a long, voluminous or inflated flame of the character described, practically filling the kiln. The amount of diluent required for this purpose will obviously vary with the character and temperature of the producer gas and with the heat of the air used to burn it, and must be left to the judgment of the workman in each instance, the dilution being controlled by suitable manipulation of the various valves in the pipes on the suction side of the fan till the desired type of flame is produced. Rather high dilutions is frequently desirable; in some cases as high as 50 to 100 per cent. of stack gases, running 14 to 15 per cent. of carbon dioxid, may be added to the entering air. Much however will depend upon the temperature of the air, the composition and temperature of the producer gas, and the length and position of the flame desired. It is ordinarily desirable to add at least enough to prevent a distinct stratification of the flame in the kiln.

Hot air is furnished to the flame from two sources, the clinker pit of the clinkerer and the recuperator (3) shown in the housing of the calciner. Hot gases from the clinkerer may assist in heating this recuperator. As however it is desirable to throttle down the draft of the calciner in many instances without interfering with the draft of the clinkerer, an auxiliary by-pass 33 is provided for shunting all or part of the waste gases from the clinkerer around the damper above the recuperator, a damper 34' being provided for this purpose.

Since calcination of calcium carbonate dos not begin much below 1300° F. and the sensible heat of the waste gases is more than enough to heat up the cement material to calcining temperature in the process herein described, heat can advantageously be recovered from such waste gases, the more so as with the type of flame described combustion ceases somewhat below the stated temperature, and the kiln must be run to produce complete combustion before the temperature of such gases drops much therebelow. The recovery of heat can be, as shown in Fig. 1, by the use of air heating recuperators, or it may be by heating boilers or feed water heaters.

In Figs. 2 and 3 I have shown such a method of recovery, the upper or calcining kiln for the sake of simplicity being shown alone without the clinkerer. In these figures, 1 is, as before, the calcining kiln, 2 an upper housing, 5, 6 and 7 are feeding means for raw material; 8 is a lower housing having conduit 9 for discharging calcines; 10 is a gas burner; 11 an air conduit for admitting dilute air; 12 an air pipe from the blast side of fan 13; 14 is a conduit for hot products of combustion and 29 is a gas producer. Communicating with the upper casing is a flue 33 passing waste gases to boiler or feed water heater 34 by means of suction fan 35, said fan delivering the gases to stack 36. At the lower end of the kiln, the calcines drop on a conveyer 37, substantially like that shown for the clinkers in Fig. 1, which takes them to exit through a long conduit like that of Fig. 1 forming an air heater.

From this conduit, pipe 39 withdraws hot air, delivering it to the fan. This calciner may either operate on cement materials like the similar calciner of Fig. 1, delivering the calcines to a clinker kiln; or it may be used for calcining limestone, marl, etc., to produce lime. The two operations however being somewhat different, the calciner is operated differently in each.

When the calciner is operated in combination with a clinker kiln it is desirable that the calcines be deliverd as hot as possible to facilitate work in the clinker kiln and the proportion of diluent gases in the air used for burning the producer gas should be somewhat reduced to cause the flame to burn nearer the mouth of the kiln. Under such circumstances, the glowing calcines near the mouth and the gas mixture mutually influence each other, the former giving off radiant heat which quickens combustion in the latter. The flame begins to develop heat near the mouth of the kiln. In burning lime, it is desirable that the calcines come out less heated, or comparatively cool, and the various valves are so manipulated as to shift the glowing zone farther up the kiln so that lime passing down the kiln past the glowing zone will give up much of its heat to the inflowing gases. In shifting the glowing zone backward it is ordinarily necessary to use more diluent gas.

In gas mixtures of the kind herein contemplated, though the air and combustible gas soon become well admixed in the kiln combustion is relatively slow, being retarded both by the diluent influence of the products of combustion and the specific retarding action of the $CO_2$ of such products. In a mixture of this kind molecule of oxygen and molecule of carbon monoxid may be side by side, as in the explosive mixture of the gas engine cylinder, without rapid combustion or explosion. But as such a mixture comes under the influence of radiant heat from the kiln walls and calcines it begins to burn and give out heat with a rapidity proportional to the temperature of the radiant walls. Such a glowing zone once established in a kiln with the gas mixtures of the present invention therefore tends to maintain itself and its localization irrespective of small differences in the composition and temperature of the gas mixture. The gas mixture is delivered hot to the glowing zone and under the influence of the radiant heat'combustion begins and is completed, the combustion heat of the gas mixture being in turn delivered to maintain the glowing zone. Combustion is indeed quicker in immediate proximity to the heat-radiating solid bodies (in this case the glowing calcines and kiln walls) and there may be some surface or contact action playing a part.

In the use of the structures shown in

Figs. 2 and 3 for burning lime, the air employed is considerably less heated than that employed in the structures of Fig. 1 where it is derived both from the clinker pit full of incandescent clinker and from a special regenerator. In burning lime, it is merely heated, as shown, by contact with the lime. With the same proportions of gas and diluent gases, the cooler the air, other things equal, the farther back in the kiln the glowing zone tends to go. In burning lime, as stated, this is desirable.

A calciner of the type described works particularly well in combination with the clinkering kiln since for economical and smooth working in the clinkering kiln it is eminently desirable that it should receive very hot calcines as free as may be of carbon dioxid. With the described calciner and flame, the calcines at some point of their progress in the kiln must of necessity be brought to a glowing heat, such a heat being required for the combustion of the gases, and at a glowing heat they rapidly lose their carbonic acid while at such glowing heat they are well adapted for introduction into the clinker kiln. While the calcining kiln of the present invention is working normally, it must deliver calcines of the correct character for use in the clinkerer.

What I desire to claim is:—

1. The process of calcining calcareous materials which comprises mixing air with products of combustion and combustible gas in controlled proportions and causing the mixture to undergo combustion in proximity to pulverulent calcareous materials contained in a hot-walled zone.

2. The process of treating calcareous materials which comprises mixing air with products of combustion and combustible gas in controlled proportions and causing the mixture to undergo combustion in proximity to a traveling stream of pulverulent calcareous materials.

3. The process of treating calcareous materials which comprises producing a traveling stream of pulverulent calcareous material passing through a rotary kiln, mixing air, products of combustion and combustible gas in controlled proportions and causing the mixture to undergo combustion in proximity to such traveling stream.

4. The process of producing cement clinker which comprises producing a traveling stream of pulverulent cement material, mixing air, products of combustion and combustible gas in controlled proportions, causing the mixture to undergo combustion in proximity to such stream until said material is calcined and then clinkering the calcines by a separate source of heat.

5. The process of producing cement clinker which comprises producing a traveling stream of pulverulent cement material in a rotary kiln, mixing air, products of combustion and combustible gas in controlled proportions, causing the mixture to burn in such kiln in proximity to such material to calcine the same, and then clinkering the calcines by a separate source of heat.

6. The process of producing cement clinker which comprises producing a traveling stream of pulverulent cement material in a rotary kiln, mixing air, products of combustion and combustible gas, in controlled proportions, causing the mixture to burn in such kiln in proximity to such material to calcine the same, and then clinkering the calcines in another rotary kiln by a separate source of heat.

7. In the treatment of calcareous materials, the process which comprises mixing air, products of combustion and combustible gas, in controlled proportions, burning the mixture in proximity to pulverulent calcareous material, removing the flame gases from such proximity and recovering their excess of heat.

8. Apparatus for treating calcareous material comprising a rotary kiln, means for feeding producer gas thereto, means for feeding air to burn such gas and means for admixing such air with products of combustion.

9. Apparatus for treating calcareous material comprising a rotary kiln, means for feeding producer gas thereto, means for feeding hot air to burn such gas and form a flame in said kiln and means for supplying products of combustion to such flame.

10. Apparatus for treating calcareous material comprising a rotary kiln, means for feeding producer gas thereto, a housing at the upper end of such kiln, recuperative air heating means therein, a stack on the housing, throttling means in such stack, means for passing air through such recuperative means into proximity with the gas feed of such kiln to burn such gas, and means for mixing stack gases with such air.

11. Apparatus for producing cement clinker comprising a rotary calcining kiln, means for feeding producer gas thereto, means for burning such gas with a mixture of air and products of combustion and a separately heated clinkering kiln receiving calcines from such calcining kiln.

12. Apparatus for producing cement clinker comprising a rotary calcining kiln, means for feeding producer gas thereto, means for feeding air in proximity to the gas feed to burn such gas, means for heating such air recuperatively by the waste gases from the kiln, means for diluting such air with waste gases, and a rotary separately heated clinkering kiln receiving calcines from such calcine kiln.

13. Apparatus for producing cement clinker comprising a rotary calcining kiln, means for feeding producer gas thereto, means for feeding heated air into proximity to the gas feed to burn such gas, said means comprisng a connection with the air space of a clinker pit and a connection with recuperative means in the waste gas outlet of such calcining kiln, means for diluting such heated air with waste gases, a rotary clinkering kiln receiving calcines from such calcining kiln and a clinker pit receiving clinker from such clinkering kiln and affording heated air for such burning means.

14. In clinker making apparatus, the combination of a calcining kiln having means for producing a dilated flame of comparatively great volume and comparatively low temperature, burning with the aid of diluted air, therein, with a separately heated clinkering kiln receiving calcines from such calcining kiln.

In testimony whereof, I affix my signature in the presence of two witnesses.

BYRON E. ELDRED.

Witnesses:
ERNEST CHADWICK,
LEWIS T. KNOX.